United States Patent
Rudd

(10) Patent No.: US 12,037,988 B2
(45) Date of Patent: Jul. 16, 2024

(54) COMMUNICATING FLUID VESSEL ENGINE SYSTEMS

(71) Applicant: James D. Rudd, Key Largo, FL (US)

(72) Inventor: James D. Rudd, Key Largo, FL (US)

(*) Notice: Subject to any disclaimer, the term of this patent is extended or adjusted under 35 U.S.C. 154(b) by 0 days.

(21) Appl. No.: 18/273,712

(22) PCT Filed: Jan. 31, 2022

(86) PCT No.: PCT/US2022/014516
§ 371 (c)(1),
(2) Date: Jul. 21, 2023

(87) PCT Pub. No.: WO2022/169702
PCT Pub. Date: Aug. 11, 2022

(65) Prior Publication Data
US 2024/0093674 A1     Mar. 21, 2024

Related U.S. Application Data

(60) Provisional application No. 63/144,729, filed on Feb. 2, 2021.

(51) Int. Cl.
*F03G 3/06* (2006.01)
*F01D 15/10* (2006.01)
(Continued)

(52) U.S. Cl.
CPC ............... *F03G 3/06* (2013.01); *F01D 15/10* (2013.01); *F03B 17/025* (2013.01); *F03B 17/04* (2013.01); *F03B 17/06* (2013.01); *F05D 2220/76* (2013.01)

(58) Field of Classification Search
CPC ........ F01D 15/10; F03B 17/025; F03B 17/04; F03B 17/06; F03G 3/06; F03G 3/096;
(Continued)

(56) References Cited

U.S. PATENT DOCUMENTS

| 2,239,064 | A | * | 4/1941 | Tower | F03B 17/02 60/640 |
| 5,671,602 | A | | 9/1997 | Hashimoto | |

(Continued)

FOREIGN PATENT DOCUMENTS

| GB | 2544774 A | * | 5/2017 | .............. F03B 17/02 |

OTHER PUBLICATIONS

International Preliminary Report on Patentability in International Appln. No. PCT/US2022/014516, mailed on Aug. 17, 2023, 11 pages.

(Continued)

*Primary Examiner* — Kenneth Bomberg
*Assistant Examiner* — Matthew Wiblin
(74) *Attorney, Agent, or Firm* — Fish & Richardson P.C.

(57) ABSTRACT

An engine system includes three communicating fluid vessels that each contain a fluid. A first interconnecting fluid conduit containing the fluid rotatably couples the second fluid vessel to the first fluid vessel and acts as a lever. A second interconnecting fluid conduit containing the fluid rotatably couples the third fluid vessel to the first fluid vessel and acts as another lever. By increasing the fluid column heights in the communicating fluid vessels, torque is applied to the levers to cause the second and third fluid vessels to revolve around the first fluid vessel.

23 Claims, 11 Drawing Sheets

(51) Int. Cl.
    *F03B 17/02*     (2006.01)
    *F03B 17/04*     (2006.01)
    *F03B 17/06*     (2006.01)

(58) Field of Classification Search
    CPC . F03G 7/08; F03G 7/104; F03G 7/107; F05D 2220/76
    See application file for complete search history.

(56) References Cited

U.S. PATENT DOCUMENTS

| | | | | |
|---|---|---|---|---|
| 6,042,342 | A * | 3/2000 | Orian | F04F 1/06 |
| | | | | 417/208 |
| 6,115,950 | A * | 9/2000 | Al-Mutairi | F03B 17/04 |
| | | | | 40/406 |
| 7,222,487 | B1 | 5/2007 | Hinkley | |
| 7,895,934 | B2 | 3/2011 | McKinney | |
| 2003/0214135 | A1* | 11/2003 | Peloquin | F03B 17/025 |
| | | | | 290/54 |
| 2011/0108362 | A1* | 5/2011 | Gorney | F03G 7/10 |
| | | | | 74/DIG. 9 |

OTHER PUBLICATIONS

International Search Report and Written Opinion in International Appln. No. PCT/US2022/014516, mailed on Jul. 14, 2022, 14 pages.

\* cited by examiner

COMMUNICATING FLUID VESSEL ENGINE SYSTEMS

CROSS-REFERENCE TO RELATED APPLICATIONS

This application is a National Stage Application under 35 U.S.C. § 371 and claims the benefit of International Application No. PCT/US2022/014516 filed Jan. 31, 2022, which claims the benefit of U.S. Provisional Application Ser. No. 63/144,729 filed Feb. 2, 2021. The disclosure of the prior application is considered part of (and is incorporated by reference in) the disclosure of this application.

TECHNICAL FIELD

This disclosure relates to systems that produce motion that can be harnessed for useful purposes, such as to generate electricity. For example, this disclosure relates to a communicating fluid vessel system that moves a lever that can drive an electrical generator. The communicating fluid vessel system utilizes changes in the volume, and thereby the weight, of a column of fluid that results from changing the displacement of an object in an adjacent communicating column of fluid.

BACKGROUND

Humans have become addicted to fossil fuels for transportation, heat, and to generate power. It is well documented that carbon levels in the atmosphere have been increasing steadily, leading to global warming and the resulting climate change. It is also well documented that the leading cause of carbon level rise is the creation of energy using fossil fuels.

In developed countries, electricity from fossil fuel is cheap and readily available, providing a disincentive to switch to alternative fuel sources. However, the size and complexity of the facility needed for fossil fuel burning energy plants to produce enough electricity prevents such an energy production source from being readily available in poor and underdeveloped countries. These countries suffer from an energy shortage.

Renewable energies such as solar power, wind turbine, and hydroelectric energy alternatives are known in the art. However, these alternatives suffer from the disadvantage that they are still relatively inefficient, expensive to build, and often require specific climate conditions such as wind, rainfall, snowmelt or the like to produce electricity. Such conditions are not readily available throughout the world.

SUMMARY

Engine system described herein include three communicating fluid vessels that each contain a fluid. The three communicating fluid vessels include a first fluid vessel containing the fluid, a second fluid vessel containing the fluid, and a third fluid vessel containing the fluid. A first interconnecting fluid conduit containing the fluid rotatably couples the second fluid vessel to the first fluid vessel and acts as a lever. A second interconnecting fluid conduit containing the fluid rotatably couples the third fluid vessel to the first fluid vessel and acts as another lever. By increasing the fluid column heights in the communicating fluid vessels, torque is applied to the levers to cause the second and third fluid vessels to revolve around the first fluid vessel.

In one aspect, this disclosure is directed to an engine system that has communicating fluid vessels. The engine system includes a first fluid container containing a fluid, a second fluid container containing the fluid, and a third fluid container containing the fluid. The engine system also includes a first interconnecting lever conduit containing the fluid and rotatably coupled to the first fluid container at a first axis, and a second interconnecting lever conduit containing the fluid and rotatably coupled to the first fluid container at the first axis and coupled to the first interconnecting lever conduit in a fixed arrangement. The first interconnecting lever conduit is also rotatably coupled to the third fluid container. The first interconnecting lever conduit defines a first fluid passageway by which the first and third fluid containers are in fluid communication. The second interconnecting lever conduit is also rotatably coupled to the second fluid container. The second interconnecting lever conduit defines a second fluid passageway by which the first and second fluid containers are in fluid communication. The second and third fluid containers are free to revolve around the first fluid container as the first and second interconnecting lever conduits rotate about the first axis relative to the first fluid container.

In some embodiments, the engine system also optionally includes a buoyant member in the first fluid container. The buoyant member is partially in the fluid and partially above the fluid.

In some embodiments, the engine system also optionally includes a tank in the second fluid container and comprising: (i) a lower portion configured to allow the fluid to pass into and out of an interior of the tank and (ii) an upper portion that is fluidly sealed.

In some embodiments, the engine system also optionally includes a tether physically linking the buoyant member and the tank together.

In some embodiments, the engine system also optionally includes a supply of a gas that is in fluid communication with the interior of the tank, wherein supplying the gas to the interior of the tank displaces at least some of the fluid from the interior of the tank to increase a column height of the fluid in each of the first, second, and third fluid containers.

Such an engine system may optionally include one or more additional optional features. In some embodiments, as the fluid is displaced from the interior of the tank, an elevation of the fluid increases equally in each of the first, second, and third fluid containers. As the fluid is displaced from the interior of the tank, a mass of the fluid in the third container may increase more than a mass of the fluid in the first container and/or a mass of the fluid in the second container. The increased mass of the fluid in the third container increases a torque exerted on the first interconnecting lever conduit by the third container. The engine system may also comprise an electrical generator. The torque created by the engine system can be used to drive rotations of the electrical generator. In some embodiments, each of the first, second, and third fluid containers are vented to atmosphere. Each of the second and third fluid containers may have an attached weight that causes the second and third fluid containers to maintain a vertical orientation as the second and third fluid containers revolve around the first fluid container. The supply of the gas may be an air compressor. The first fluid container may have a greater cross-sectional area than the second and third fluid containers. The second fluid container is disposed between the first and third fluid containers.

In some embodiments, four or more of the engine systems (of any of the embodiments described herein) are each coupled to drive rotations of a common output shaft. The rotations of the output shaft drive may drive rotations of the electrical generator. In some embodiments, the interconnecting lever conduits of the first, second, third, and fourth engine system are 90° out of orientation in relation to each other.

In another aspect, this disclosure is directed to an engine system comprising at least one communicating vessel configured to shift fluid mass to and from an end of a lever to generate torque and to supply motive power.

Such an engine system may optionally include one or more of the following features. The at least one communicating vessel may include a first fluid container containing a fluid; a second fluid container containing the fluid; and a third fluid container containing the fluid. The engine system may also include a first interconnecting lever conduit containing the fluid and rotatably coupled to the first fluid container at a first axis. The first interconnecting lever conduit may also be rotatably coupled to the third fluid container. The first interconnecting lever conduit may define a first fluid passageway by which the first and third fluid containers are in fluid communication. The engine system may also include a second interconnecting lever conduit containing the fluid and rotatably coupled to the first fluid container at the first axis and coupled to the first interconnecting lever conduit in a fixed arrangement. The second interconnecting lever conduit may also be rotatably coupled to the second fluid container. The second interconnecting lever conduit may define a second fluid passageway by which the first and second fluid containers are in fluid communication. The second and third fluid containers may be free to revolve around the first fluid container as the first and second interconnecting lever conduits rotate about the first axis relative to the first fluid container.

In some embodiments, the engine system also includes an optional buoyant member in the first fluid container. The buoyant member may be partially in the fluid and partially above the fluid. In some embodiments, the engine system also includes an optional tank in the second fluid container and comprising: (i) a lower portion configured to allow the fluid to pass into and out of an interior of the tank and (ii) an upper portion that is fluidly sealed. Optionally, the engine system may also include a tether physically linking the buoyant member and the tank together.

In some embodiments, the engine system optionally includes a supply of a gas that is in fluid communication with the interior of the tank. Supplying the gas to the interior of the tank may displace at least some of the fluid from the interior of the tank to increase a column height of the fluid in each of the first, second, and third fluid containers.

Unless otherwise defined, all technical and scientific terms used herein have the same meaning as commonly understood by one of ordinary skill in the art to which this disclosure pertains. In addition, the materials, methods, and examples of the embodiments described herein are illustrative only and not intended to be limiting.

The details of one or more embodiments of the invention are set forth in the accompanying drawings and the description herein. Other features, objects, and advantages of the invention will be apparent from the description and drawings, and from the claims.

BRIEF DESCRIPTION OF THE DRAWINGS

The present disclosure will be better understood by reading the written description with reference to the accompanying drawings, in which like reference numerals denote similar structure and refer to like elements throughout, in which.

DETAILED DESCRIPTION

The engine systems disclosed in this document operate using at least two scientific principles in general. The first principle is that of a lever. A lever is a simple machine that takes a small amount of force over a long distance and converts it to a large amount of force over a short distance. The second principle is based upon a communicating fluid vessel system. A communicating fluid vessel system includes two or more containers that are fluidly connected at or near their bottoms, that are open to the atmosphere, and that contain a homogeneous fluid.

The nature of a communicating fluid vessel system is that the surface of each fluid column maintains an equal elevation with all other fluid columns of the system. This is a result of nature's propensity to equalize the fluid pressure at common elevations among the fluid columns. Since the fluid pressure of a fluid column open at the top to the atmosphere is linearly proportional to the depth at that point from the surface, a communicating vessel system can remain stable only when the pressure at all elevations of the fluid columns are the same. This also means that the elevation of the top surface of each fluid column within the system is the same.

In the series of figures provided by this disclosure, components of the communicating fluid vessel system described herein are introduced and explained in a gradual manner in order to help the reader gain a clear understanding of each portion of the system. For example, some of the initial figures show only portions of the system in a schematic manner, and then later figures show other portions and the overall system. In addition, some of the figures show particular portions of the system in detail while other portions of the system are excluded from those figures. Accordingly, in such a case the reader can gain an understanding specifically about those particular portions of the system. These techniques for explaining the systems disclosed herein are used to help the reader understand each portion of the systems, and to understand the structure and operation of the overall systems.

Figure 1:
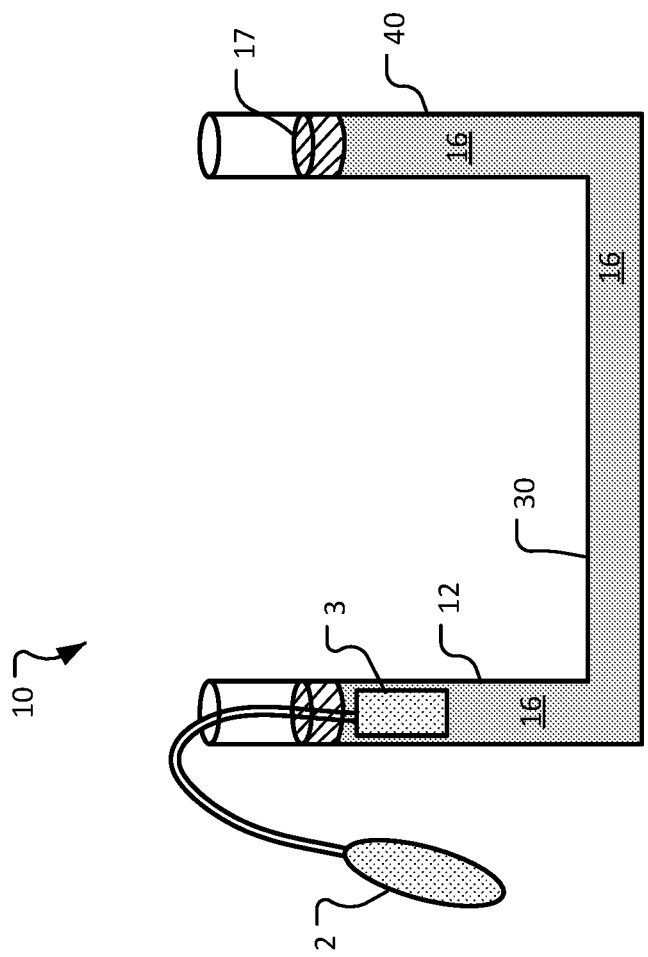
FIG. 1 is a schematic illustration showing, in general, a front view of an example communicating vessel system.

FIG. 1 schematically shows an example communicating fluid vessel system 10 (or simply "system 10") containing a fluid 16. The system 10 includes a fixed container 12, an outer container 40, and an interconnecting conduit 30. The interconnecting conduit 30 fluidly connects the fixed container 12 to the outer container 40.

Work can be added to the system 10, e.g., by squeezing a bulb or ball 2 to move, by way of a hose, air into a bladder 3 that is tethered within the fluid column of the fixed container 12. As the bladder 3 expands, fluid in the system 10 is displaced. Note that the ball 2, hose and bladder 3 are for illustrative purposes only, and are not necessarily part of the invention. The displacement of some of the fluid 16 from the expansion of the bladder 3 increases the fluid column height in the fixed container 12, and by virtue of the interconnecting conduit 30, shifts (displaces) an additional volume 17 of the fluid 16 (with its additional fluid mass) to the top of previously existing fluid column in the outer container 40. This additional fluid 17 is also referred to herein as an additional volume of fluid 17, new fluid mass 17, or Vadditional 17.

The work added to expand the bladder 3 is approximately proportional to the amount of new fluid mass 17 shifted (displaced) to the top of the fluid column in the outer container 40. Moreover, the work added to increase the fluid column height in the outer container 40 is independent of the starting fluid column height in the system 10 (as long as the depth of the bladder 3 below the surface of the fluid 16 in the fixed container 12 remains the same). The reverse is also true. That is, contracting the bladder 3 equally decreases the fluid column heights in the fixed container 12 and the outer container 40.

Figure 2:
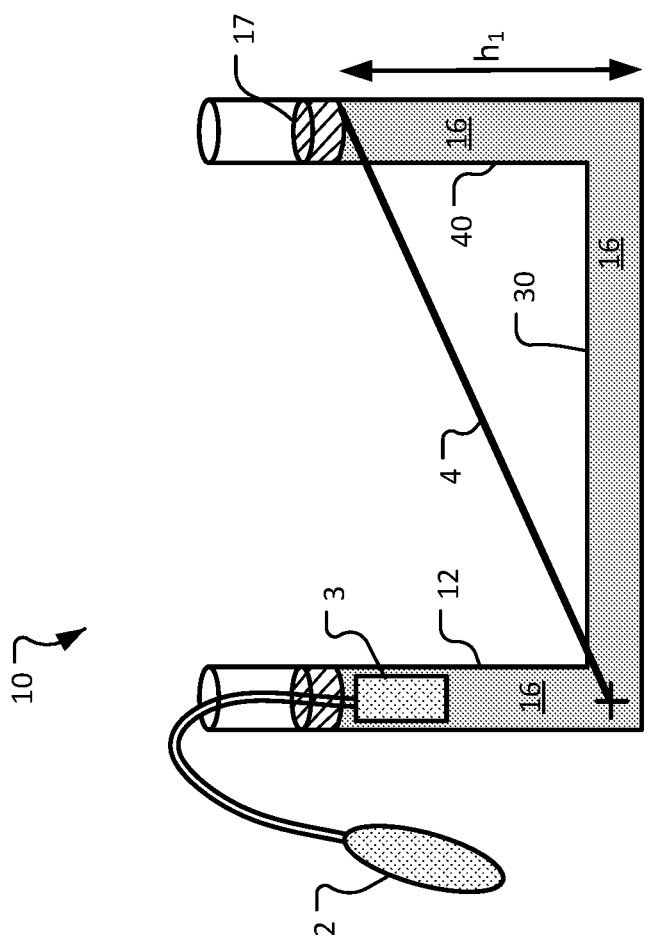
FIG. 2 shows the set of communicating vessels of FIG. 1 with an example lever overlaying the illustration.
Figure 3:
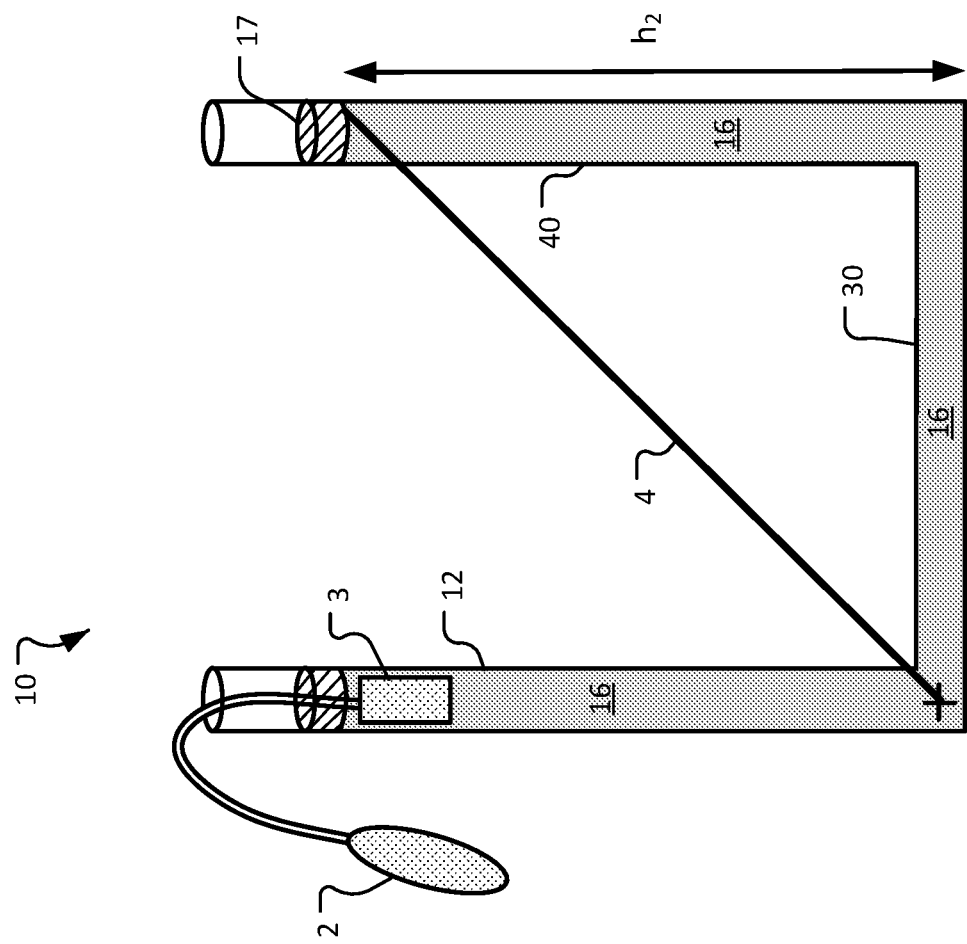
FIG. 3 shows the arrangement of FIG. 2 in another configuration.

Referring also to the schematic diagrams of FIGS. 2 and 3, the system 10 can also include a lever 4. The lever 4 is rotatably coupled to the base of the fixed container 12 at a first axis. Accordingly, the lever 4 can rotate about the first axis.

FIG. 2 shows the system 10 with the outer container 40 having an initial fluid column height $h_1$. FIG. 3 shows the system 10 with the outer container 40 having an initial fluid column height $h_2$. The height $h_2$ is greater than the height $h_1$. It follows then, that the weight of the fluid column height $h_2$ plus Vadditional 17 applied to the lever 4 of FIG. 3 results in a greater torque of the lever 4 about its axis of rotation as compared to the weight of the fluid column height $h_1$ plus Vadditional 17 applied to the lever 4 of FIG. 2. This remains true even though the work required to squeeze the ball 2 to increase the fluid column heights in the containers 12/40 (resulting in Vadditional 17) is the same in both FIG. 2 and FIG. 3.

Figure 4:
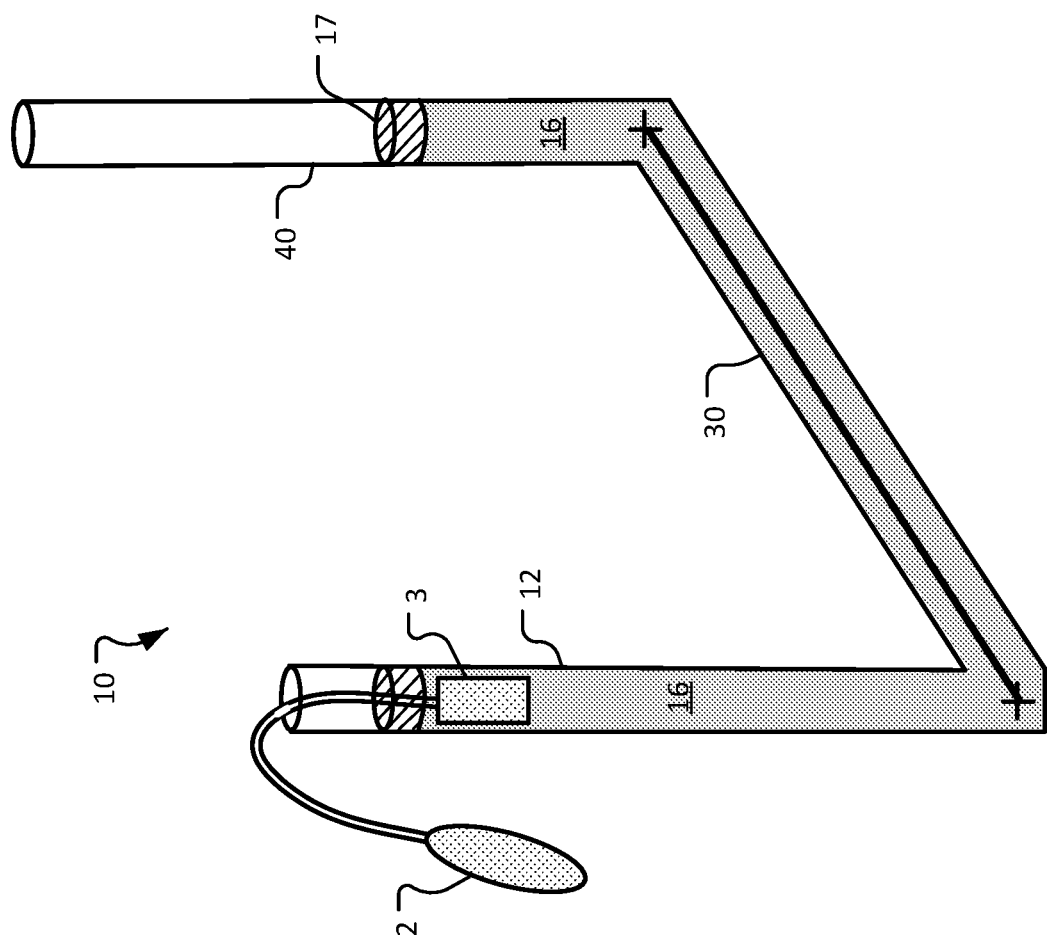
FIG. 4. shows the arrangement of FIG. 3 with the lever being the conduit that fluidly interconnects the communicating vessels.

Referring also to FIG. 4, here the interconnecting conduit 30 has been combined with the lever 4 to create an interconnecting lever conduit 30. The interconnecting lever conduit 30 functions not only to fluidly interconnect the containers 12 and 40, but also to act as a lever. A first end of the interconnecting lever conduit 30 is rotatably coupled to the fixed container 12 and the other end the interconnecting lever conduit 30 is rotatably coupled to the outer container 40. The rotatable couplings can comprise rotary unions that allow fluid to flow through the rotatable connections. This arrangement allows the interconnecting lever conduit 30 itself to be used as the lever with the axis of rotation at the bottom of the fixed container 12, and the outer container 40 residing at the outer end of the interconnecting lever conduit 30.

As work is added to increase the fluid column height in the fixed container 12 (e.g., from expanding the bladder 3) the natural equalization of the fluid column pressures in the communicating vessels of the system 10 causes fluid 16 to be displaced, and Vadditional 17 is displaced to the top of the fluid column in outer container 40. With the interconnecting lever conduit 30 being free to rotate about its axis of rotation at the bottom of the fixed container 12, the weight of the fluid column height in the outer container 40 (including Vadditional 17) causes a torque of the interconnecting lever conduit 30 about its axis of rotation at the bottom of the fixed container 12.

Figure 5:
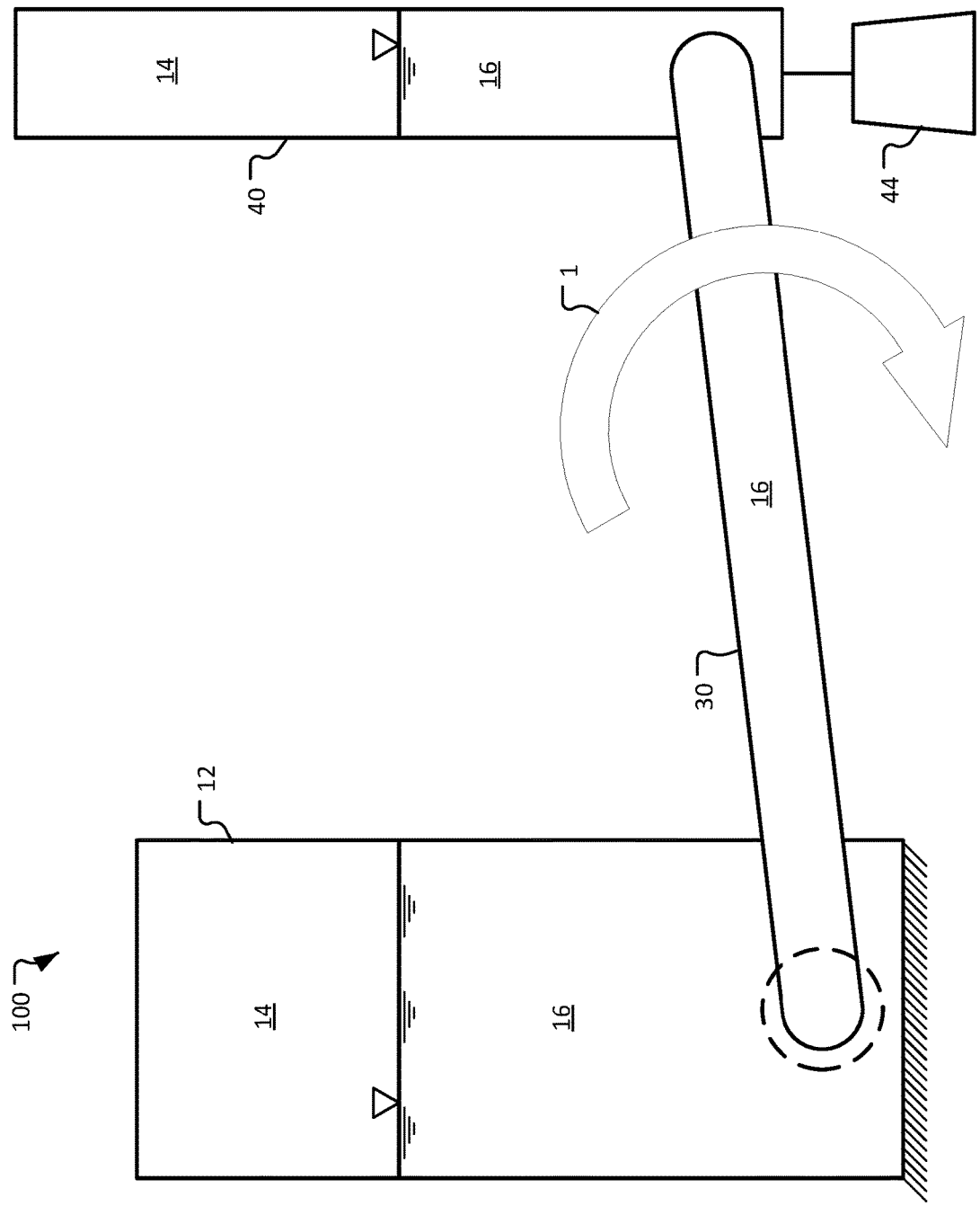
FIG. 5 is a schematic illustration showing a front view of another example communicating vessel system with the conduit that fluidly interconnects the communicating vessels acting as a lever.

FIG. 5 depicts a communicating fluid vessel system 100 that is analogous to the system 10 described above. There are three main parts of the system 100: the fixed container 12 (containing the fluid 16); the interconnecting lever conduit 30 (containing the fluid 16); and the outer container 40 (containing the fluid 16). The interconnecting lever conduit 30 fluidly couples the fixed container 12 with the outer container 40. The system 100 uses the combined principles of a mechanical lever and a communicating fluid vessel system.

The system 100 includes the two containers (the fixed container 12 and the outer container 40) that are each filled with a homogeneous fluid (the fluid 16). The fixed container 12 and the outer container 40 are in fluid communication with each other via the interconnecting lever conduit 30, are subject to the same atmospheric pressure, and are connected at their bases by the interconnecting lever conduit 30 (which acts as a mechanical lever).

When the fluid 16 is settled in the system 100, the fluid 16 balances out to the same level (elevation) in both of the containers 12 and 40 regardless of the shape and volume of the containers 12 and 40. Naturally, a change in fluid column height in one container will cause an equal change in the fluid column height in all containers of the system 100. However, even though the fluid column heights in all containers of the system 100 change equally, the associated change in volume of fluid in each container will be allocated based upon the fluid surface area of each container. For example, if a first container has twice the cross-sectional surface area of fluid as compared to a second container, the first container will receive double the fluid volume of the second container when fluid is added to the containers.

Still referring to FIG. 5, the fixed container 12 is fixed in space. In some embodiments, the container 12 resides on a stand, a foundation, and the like (not shown). The outer container 40, in contrast, rotates or revolves 360° around the fixed container as indicated by the arrow 1. The circular path followed by the outer container 40 around the fixed container 12 is defined or controlled by the interconnecting lever conduit 30 that fluidly and mechanically interconnects the fixed container 12 and the outer container 40.

The interconnecting lever conduit 30 is multifunctional. That is, first, the interconnecting lever conduit 30 acts as a pivotable mechanical connection between the fixed container 12 and the outer container 40. In that sense, it can be said that the interconnecting lever conduit 30 acts as a lever arm. In addition, the interconnecting lever conduit 30 allows fluid flow therethrough such that the interiors of the fixed container 12 and the outer container 40 are fluidly connected. In that sense, it can be said that the interconnecting lever conduit 30 acts as a hose or fluid conduit.

Since the interior volumes of the fixed container 12 and the outer container 40 are fluidly connected by the interconnecting lever conduit 30, the interfaces between the fluid 16 and the air 14 in both of the containers 12 and 40 are at, and by nature will always be at, the same elevation. Said simply, the level of the fluid 16 in each of the containers 12 and 40 will always be at equal elevations (even as the outer container 40 rotates around the fixed container 12). This is the principle of a communicating fluid vessel system.

Attached to the outer container 40 (or integral therewith) is a weight 44. The weight 44 serves to keep the outer container 40 essentially vertical (as depicted in FIG. 5) as the outer container 40 rotates around the fixed container 12.

A rotary union can be used at the rotatable junction between the outer container 40 and the interconnecting lever conduit 30. Accordingly, as the outer container 40 rotates around the fixed container 12, the fluid 16 can freely pass between the outer container 40 and the fixed container 12 via the interconnecting lever conduit 30, and the outer container 40 can remain essentially vertical.

The orientation of the interconnecting lever conduit 30 relative to the fixed container 12 can be defined in reference to the position of an arm on an analog clock. For example, when the interconnecting lever conduit 30 is extending straight upward relative to the fixed container 12, it can be said that the interconnecting lever conduit 30 (and the outer container 40) is at the 12 o'clock position. Or, when the interconnecting lever conduit 30 is extending laterally (horizontal) relative to the fixed container 12, it can be said that the interconnecting lever conduit 30 (and the outer container 40) is at the 3 o'clock position or the 9 o'clock position (depending on whether the interconnecting lever conduit 30 is extending rightward or leftward from the fixed container 12). This nomenclature (using the clock analogy) will be used hereafter to describe the relative position of the outer container 40 (and the middle container 60) relative to the fixed container 12.

System 100, as described further below, is composed of three fluidly communicating containers: (i) the fixed container 12, (ii) the outer container 40, and (iii) a middle container 60 (not shown here for simplicity, see FIGS. 7-12, for example). All three containers 12, 40, and 60 are open to the environment 14 at the top. All three containers 12, 40, and 60 are closed on their respective bottom and sides. The three communicating containers 12, 40, and 60 are configured to hold a fluid 16, say water. Hereafter in this disclosure, air 14 and water 16 will be used for simplicity sake. It should be understood, however, that other fluids can be used in the system 100 as long as the density of the fluids are differing.

As described further below, the core design of the communicating fluid vessel engine systems described herein is that multiple communicating fluid vessel systems (e.g., the system 100) are arranged in the design of a wheel and axle such that the fixed container 12 of each system 100 fixedly resides on the axis of the wheel, the interconnecting lever conduit 30 acts as a spoke in the wheel, and outer container 40 resides on the rim of the wheel. As described further below, multiple outer containers 40 can be equally spaced around the wheel. Each system 100 can be identical, and all can contain the same volume of fluid 16. The wheel and axle design is intended to be rotationally balanced before any displacement of fluid 16 in the fixed container 12 of any system 100.

Figure 6:
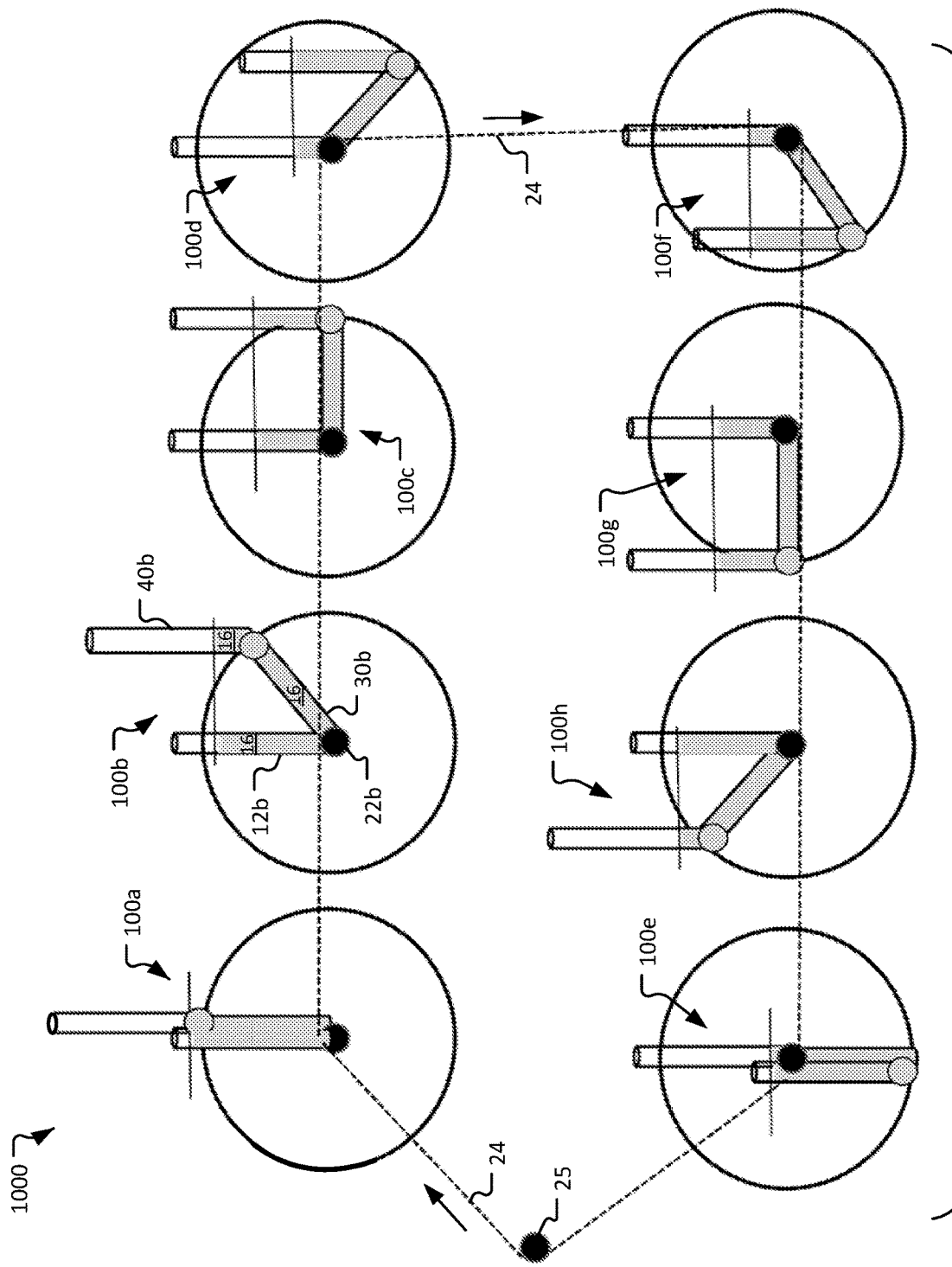
FIG. 6 is a schematic illustration showing eight of the one-lever communicating vessel systems of FIG. 5 that are mechanically coupled to operate together.

Referring also to FIG. 6, multiple systems 100 can be mechanically coupled together (or ganged together) to create an overall system 1000. In the depicted example, eight systems 100a, 100b, 100c, 100d, 100e, 100f, 100g, and 100h (collectively referred to as systems 100a-h) are mechanically coupled together to create the overall system 1000. It should be understood that, while the depicted example includes the eight systems 100a-h, any practical number of the systems 100 can be mechanically coupled together to create an overall system 1000. For example, two systems 100, three systems 100, four systems 100, and so on, can be mechanically coupled together to create an overall system 1000. In addition, it should be understood that FIG. 6 is a schematic illustration that, for the sake of clarity, does not show all portions of the systems 100a-h. For example, as described further below, the systems 100a-h each include a middle container and other components. Those portions are not shown in FIG. 6 so that the concept of mechanically coupling together multiple systems 100a-h in the manner shown can be understood without obscurity from excessive detail at this point.

The construction of each of the systems 100a-h is the same in this example. In FIG. 6, the exemplary system 100b includes labels for its fixed container 12b, outer container 40b, and interconnecting lever conduit 30b. The system 100b also includes a sprocket 22b that rotates in correspondence with the rotation of the interconnecting lever conduit 30b. It should be understood that the other systems 100a and 100c-h, while not labeled, include the same components as the system 100b.

In this example, sprockets (e.g., the sprocket 22b of the system 100b) are included on each of the systems 100a-h. Those sprockets are each movably coupled to a continuous chain 24. The chain 24 is also coupled to a driven sprocket 25 that is attached to a shaft. The chain 24 drives the rotation of the driven sprocket 25 and its associated shaft. That shaft can be coupled to a generator, for example, for generating electricity. In the depicted example, the chain 24 is moving clockwise. While the depicted overall system 1000 uses the sprockets and chain 24, it should be understood that various other types of power transmission systems can be used (e.g., gears, power transmission shafts, hydraulics, and the like).

In the depicted orientation of the overall system 1000 (which, collectively, is essentially akin to a wheel and axle), it can be observed that the system 100a is orientated in the 12 o'clock position. In addition, it can be observed that the system 100c is orientated in the 3 o'clock position. The system 100b is orientated midway between the systems 100a and 100c. Accordingly, it can be stated that the system 100b is orientated at the 1:30 o'clock position. The other systems 100d-h are oriented in other positions. For example, system 100d is oriented in the 4:30 o'clock position, the system 100e is oriented in the 6 o'clock position, the system 100f is oriented in the 7:30 o'clock position, the system 100g is oriented in the 9 o'clock position, and the system 100h is oriented in the 10:30 o'clock position. These orientations change (e.g., progress) as the overall system 1000 rotates via the chain 24, but the relative orientations between the respective systems 100a-h stay constant while the overall system 1000 rotates.

To put it another way, the systems 100a-h are incrementally oriented at 45° apart from each other. That is, for example, the system 100b is 45° clockwise in relation to the system 100a. Similarly, the system 100c is 45° clockwise in relation to the system 100b, the system 100d is 45° clockwise in relation to the system 100c, the system 100e is 45° clockwise in relation to the system 100d, the system 100f is 45° clockwise in relation to the system 100e, the system 100g is 45° clockwise in relation to the system 100f, the system 100h is 45° clockwise in relation to the system 100g, and the system 100a is 45° clockwise in relation to the system 100h. These incremental differences of 45° are maintained as the overall system 1000 rotates/operates.

It can be observed in FIG. 6, that the water in the fixed container 12 and water the outer container 40 are at equal elevations in each of the systems 100a-h (no matter what orientation the systems 100a-h are in). For example, referring to the exemplary system 100b, the water 16 in the fixed container 12b is at the same elevation as the water 16 in the outer container 40b. The equal elevations of the water are indicated by the horizontal lines drawn in each of the systems 100a-h. While the elevations of the water in the fixed container and the outer container remain equal, the volumes of the water in the fixed container 12 and the outer container 40 change, even though the total volume of water 16 in a system 100 remains the same.

Referring again to the exemplary system 100b in the orientation depicted in FIG. 6, it can be envisioned that the weight of the water 16 in the outer container 40b and the interconnecting lever conduit 30b will create a clockwise torque at the sprocket 22b that will tend to urge the chain 24 in a clockwise direction. That is, with the outer container 40b and the interconnecting lever conduit 30b being laterally offset from a vertical axis extending through the sprocket 22b, the pull of gravity on the mass of the outer container 40b, the interconnecting lever conduit 30b, and the water 16 therein will generate a clockwise torque at the sprocket 22b.

Referring now to the other systems 100a and 100c-h in the orientations shown in FIG. 6, it can be envisioned that the systems 100c and 100d will also create clockwise torques at their respective sockets. Further, in can be envisioned that the systems 100a and 100e will be neutral (i.e., not generate any torque in the depicted orientation). Still further, it can be envisioned that the systems 100f, 100g, and 100h will create a counter-clockwise torque at the sprocket 22b that will tend to urge the chain 24 in the counter-clockwise direction.

The overall system 1000 (as depicted in its partial form in FIG. 6, which is not the complete form of the overall system 1000) is balanced. That is, in terms of the torques created at the sprockets of the systems 100a-h, every clockwise torque of one system is offset by an equal counter-clockwise torque of another system, or taken together the total clockwise rotational forces from multiple systems 100a-h, should be equal to the total counter-clockwise rotational forces from multiple systems 100a-h, in the overall system 1000. For example, the clockwise torque generated by the system 100b is offset by the equal counterclockwise torque generated by the system 100h. Similarly, the systems 100a and 100e offset (or counterbalance) each other, the systems 100c and 100g offset each other, and the systems 100d and 100f offset each other.

Figure 7:
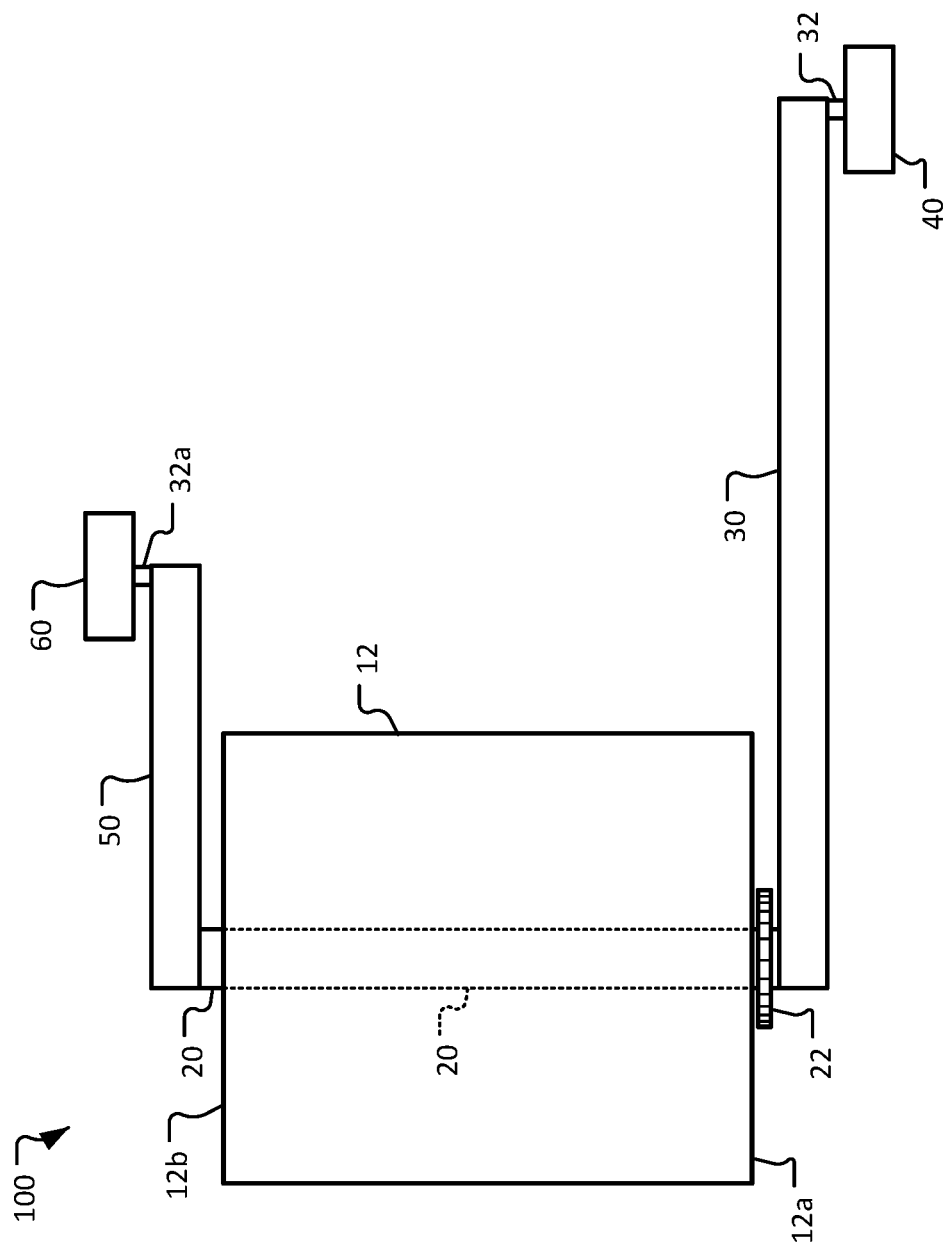
FIG. 7 is a schematic illustration showing a top view of an example two-lever communicating vessel system in accordance with some embodiments.

FIG. 7 is a top view of the system 100. The system 100 includes the fixed container 12, the interconnecting lever conduit 30, and the outer container 40 as described above. Now, the middle container 60 and its associated short lever conduit 50 are also shown for the first time.

The middle container 60 and the short lever conduit 50 function in the same manner as the outer container 40 and the interconnecting lever conduit 30 as described above. However, the short lever conduit 50 is shorter than the interconnecting lever conduit 30, so the middle container 60 is always closer to the fixed container 12 than the outer container 40.

Protruding from the front 12a and back 12b of the fixed container 12 is a tube 20 that resides in the container 12, and is designed to rotate 360 degrees in container 12 without allowing any water 16 to leak out of the fixed container 12.

Near the front 12a of container 12, connected to tube 20, is the sprocket 22. Sprocket 22 connects by way of the chain 24 (FIG. 6) to the driven sprocket 25 that drives its associated shaft.

One end of tube 20, on the front 12a of fixed container 12, is connected to the interconnecting lever conduit 30, and the other end of the tube 20, on the back 12b of fixed container 12, is connected to the short lever conduit 50. The design of tube 20 allows water 16 to move into and out of fixed container 12, and into and out of the interconnecting lever conduit 30 and the short lever conduit 50 without any water 16 leaking out of system 100.

The outer container 40 rotates around the fixed container 12 with the central axis of the tube 20 as the pivot point. The outer container 40 remains upright while traveling a complete rotation around fixed container 12 by way of the rotary union 32 and the weight 44. The elevation of the water 16 changes in the outer container 40 as the outer container 40 rotates around the fixed container 12. However, the elevations of the water 16 in each of the three containers 12, 40 and 60, always remain equal to each other.

The tube 20 also connects to the short lever conduit 50, and a rotary union 32a connects the short lever conduit 50 to the middle container 60. The middle container 60 is (like the outer container 40) also designed to rotate around the fixed container 12, with the tube 20 acting as the pivot point. Like the outer container 40, the middle container 60 also remains upright while traveling complete rotations around the fixed container 12 by way of the rotary union 32a and a weight 44a (FIG. 8).

System 100 is designed so that the fluid in middle container 60 flows into and out of short lever conduit 50, and into and out of fixed container 12 based upon the position of the middle container 60 relative to the positions of fixed container 12 and the outer container 40. That is, as the middle container 60 rotates around the pivot point of the tube 20, the elevations of the water 16 in each of the three containers 12, 40 and 60, always remain equal to each other.

In the system 100, since it is a communicating vessel system, the elevations of the columns of water 16 in the fixed container 12, the middle container 60 and the outer container 40, always maintain an equal elevation with each other, even though the volume of fluid in each individual container varies as the middle container 60 and the outer container 40 rotate around their pivot points, or axes of rotation, found at the tube 20 of the fixed container 12.

Figure 8:
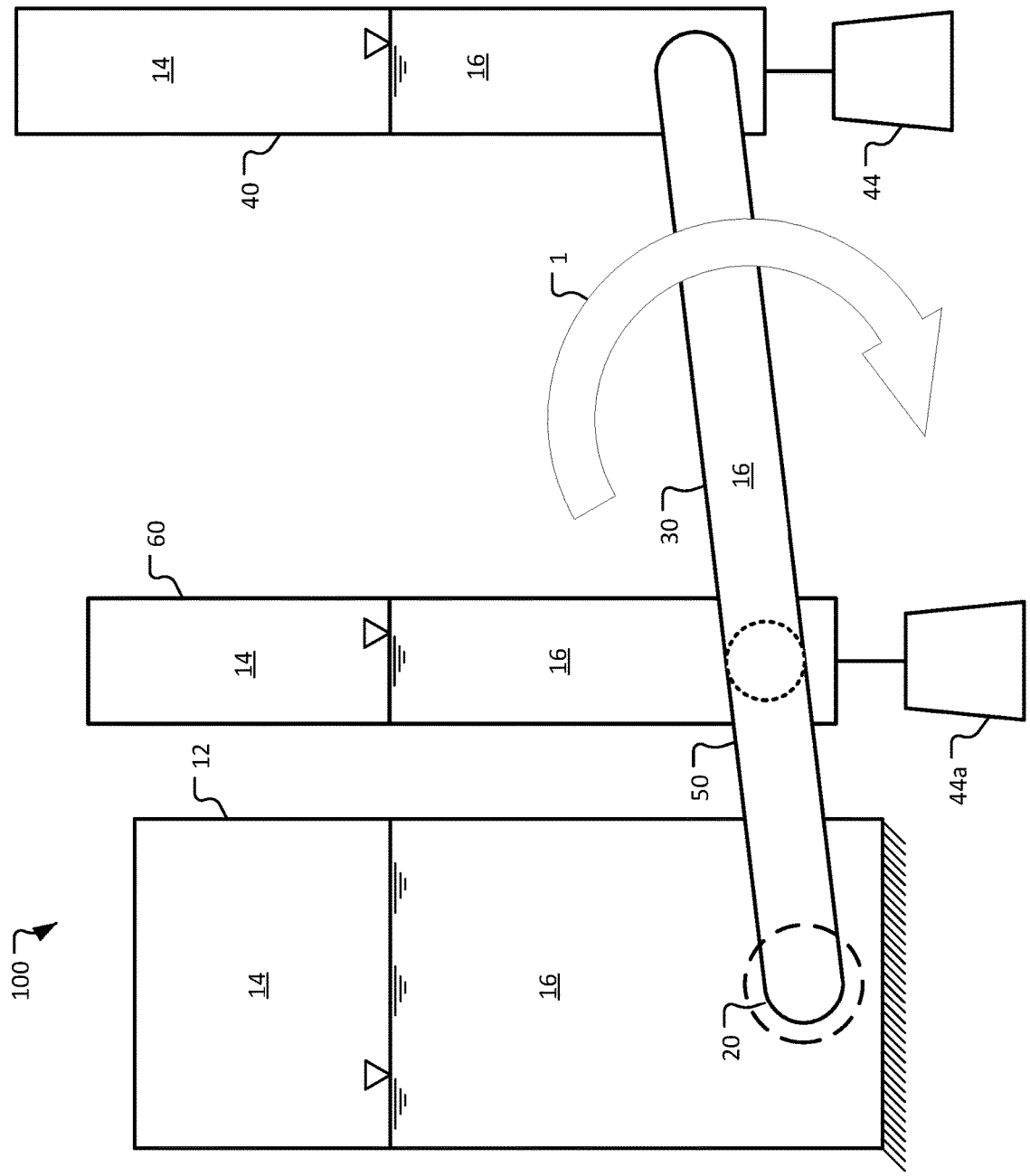
FIG. 8 is a schematic illustration showing a front view of the two-lever communicating vessel system of FIG. 7.

Referring also to FIG. 8, the short lever conduit 50 is connected to the interconnecting lever conduit 30 by way of the tube 20. The angle of rotation and orientation of both the interconnecting lever conduit 30 and the short lever conduit 50 is the same. Accordingly, as the short lever conduit 50 and its middle container 60, and the interconnecting lever conduit 30 and its outer container 40, rotate around the fixed container 12 they are always at the same angular orientation in relation to the fixed container 12. Accordingly, in this illustration the short lever conduit 50 is located out of view behind the interconnecting lever conduit 30.

In the system 100, as the outer container 40 and the middle container 60 rotate from their 12 o'clock positions to their 6 o'clock positions, the heights of the columns of water 16 rise in each container 40 and 60, and the height of the column of water 16 in fixed container 12 falls. Likewise as the outer container 40 and the middle container 60 rotate from their 6 o'clock positions to their 12 o'clock positions, the heights of the columns of water 16 falls in each container 40 and 60, and the height of the column of water 16 in fixed container 12 rises. Such is the case because the elevations of the water 16 in each container 12, 40 and 60 are always equal with each other.

Typically the volumes of the water 16 (and thereby the weights of the columns of water 16) found in the middle container 60 and outer container 40 at each point on one side of their rotation are equal to the volumes of the water 16 (and thereby the weights of the columns of water 16) at each mirror opposite point in the rotation of the middle container 60 and the outer container 40. Or said another way, in a complete rotation of the middle container 60 and the outer container 40 the clockwise rotational forces on the tube 20, equal the counterclockwise rotational forces on tube 20 (as was also described above in reference to FIG. 6).

It is understood that using a smaller number of system 100s to create a system 1000 will cause the rotational stability of the system 1000 to be disrupted at certain positions in the rotation, but this rotational instability can be reduced by increasing the number of system 100s used to make up a system 1000. This rotational instability does not change, with respect to the concepts described above, the basic manner in which the system 1000 functions.

Figure 9:
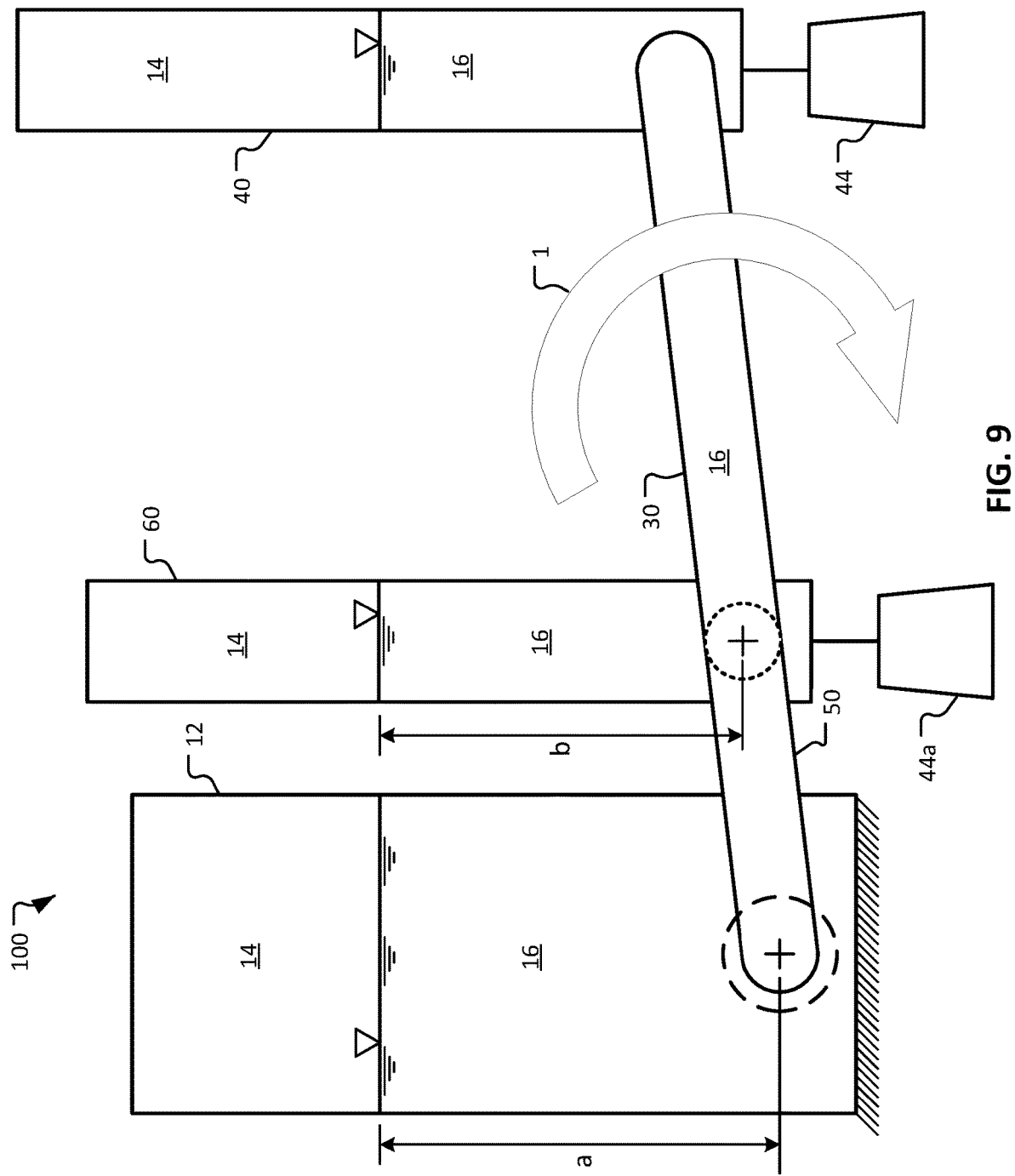
FIG. 9 is another schematic front view of the two-lever communicating vessel system of FIG. 7.

Turning our attention to FIG. 9, as the outer container 60 and middle container 40 rotate around the fixed container 12, the volume of the water 16 in each of the three containers 12, 40, and 60 changes. Generally, as the middle container 60 and the outer container 40 rotate 180° between the 12 o'clock and 6 o'clock positions, water 16 drains from the fixed container 12 and flows into the middle container 60 and the outer container 40. This process is reversed as the middle container 60 and the outer container 40 rotate 180° from the 6 o'clock to the 12 o'clock positions.

If the fixed container 12, the middle container 60, and the outer container 40 are spaced apart on the short lever conduit 50 and the interconnecting lever conduit 30 correctly, and if the fixed container 12, the middle container 60 and the outer container 40 are sized properly, then, in a complete 360° rotation of the middle container 60 around the fixed container 12, the height of the column of the water 16 in the fixed container 12 will decrease at the same rate that the height of the column of water 16 in the middle container 60 will increase on one side of the rotation (from 12 o'clock to 6 o'clock), and the height of the column of water 16 in the fixed container 12 will increase at the same rate as the column of water 16 in the middle container 60 will decrease on the other side of the rotation (from 6 o'clock to 12 o'clock). Or said another way, if the fixed container 12, middle container 60 and outer container 40 are sized and positioned properly, the fixed container's 12 column of water 16 will fall at the same rate that the middle container's 60 column of water 16 rises on one side of the rotation, and the fixed container's 12 column of water 16 will rise at the same rate that the middle container's 60 column of water 16 falls on the other side of the rotation.

In FIG. 9, the distance "a" is the total distance between the upper surface of the water 16 in the fixed container 12 and the central axis about which the interconnecting lever conduit 30 and short interconnecting lever conduit 50 rotate (i.e., the central axis of the tube 20). The distance "b" is the total distance between the upper surface of the water 16 in the middle container 60 and the central axis of the rotary union 32a (FIG. 7) that connects the short lever conduit 50 to the middle container 60. At all rotational positions of the interconnecting lever conduits 30 and 50 (and the containers 40 and 60) relative to the fixed container 12, the sum total of the distances "a" and "b" is always a constant distance.

The reason for this is that as the middle container 60 and outer container 40 fall in their rotation from the 12 o'clock position to the 6 o'clock position, both containers take in a volume of water 16 from the fixed container 12, and as the middle container 60 and the outer container 40 rise in their rotation from the 6 o'clock position to the 12 o'clock position, both containers 40 and 60 give back a volume of their water 16 to the fixed container 12.

The volumes of water 16 that move between each of the three containers, 12, 40 and 60 are dependent on two relationships. The first relationship is the relative position (elevation) of each container relative to the other two containers, at each position in the rotation. The second relationship is the cross-sectional areas of the fluid surface in each container in relation to the other two containers. The distance from the pivot point found on fixed container 12 that the middle container 60 and the outer container 40 are located at, determine how far, and at what speed, each container falls and rises in a complete rotation.

Figure 10:
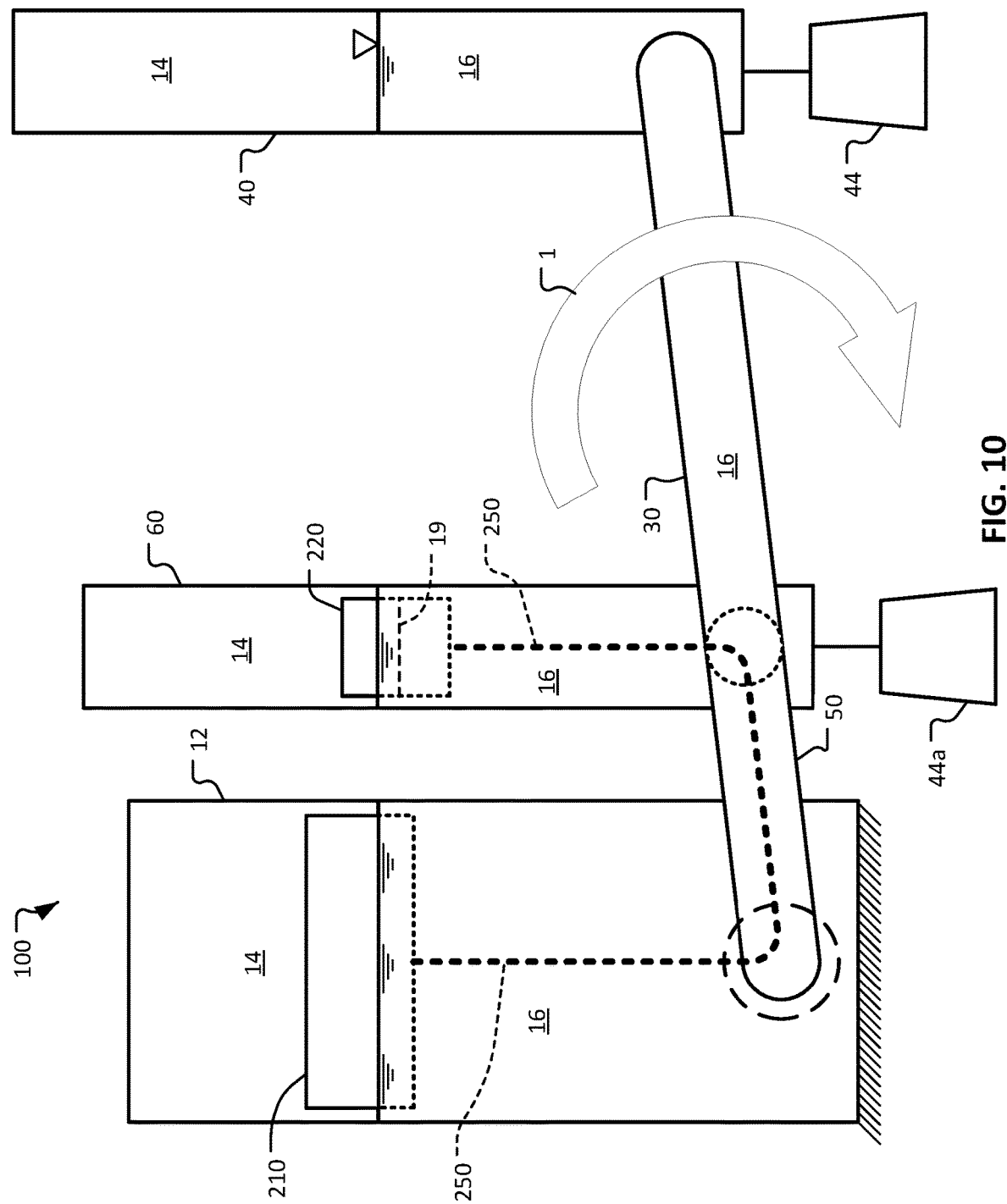
FIG. 10 is another schematic front view of the two-lever communicating vessel system of FIG. 7. This illustration shows some additional components of the system.

As shown in FIG. 10, the system 100 also includes a float 210, a holding tank 220, and a tether 250. The float 210 is a buoyant member in the fixed container 12. The holding tank 220 is an open-bottom buoyant member in the middle container 60. The presence of the float 210 and the holding tank 220 does not change, with respect to the concepts described above, the basic manner in which the system 100 functions.

The tether 250 attaches the float 210 and the holding tank 220 to each other. Accordingly, the movements of the float 210 and the holding tank 220 are linked together by the tether 250, which has a constant length. The tether 250 is routed between the fixed container 12 and the middle container 60 in a manner that allows for the rotation of the tube 20 without affecting (e.g., entangling) the tether 250. For example, in some embodiments the tether 250 is routed through an outer sleeve surrounding the tube 20.

The float 210 and the tether 250 are designed to keep holding tank 220 from rising in relation to the upper surface of the water 16 (the waterline) found in middle container 60. If holding tank 220 does rise from changes in its buoyancy, the lost displacement of the fluid 16 is replaced by the greater displacement of fluid 16 from the float 210. The purpose of strategically sizing each container 12, 40 and 60 and placing middle container 60 and outer container 40, a certain distance from the pivot point found on fixed container 12, all as described above, is so that tether 250 does not lose its effectiveness because of the changing water levels in fixed container 12 and middle container 60.

Since the float 210 and the holding tank 220 are residing at the interface between the water 16 and the air 14 in each of the fixed container 12 and the middle container 60, respectively, it can be envisioned that as water 16 flows into or out of the holding tank 220, as described below, the corresponding change in volume of the water 16 (and mass of the water 16) will be substantially greater in outer container 40 than if the float 210 and the holding tank 220 were not present in the fixed container 12 and the middle container 60.

The holding tank 220 is a container with an at least partially open bottom portion (so that water 16 can pass into and out of the interior of the holding tank 220). At least an upper portion of the interior of the holding tank 220 contains air 14, which keeps it buoyant. Inside of the holding tank 220 is a fluid-to-air interface line 19 between the denser water 16 and the less dense air 14. Changes in the volume of air 14 found in the holding tank 220 inversely change the amount of water 16 in the holding tank 220. That is, as air 14 is added into the interior of the holding tank 220, the fluid-to-air interface line 19 lowers within the holding tank 220 and some water 16 from the interior of the holding tank 220 exits the holding tank 220 and enters the middle container 60 (on the outside of the holding tank 220).

Since all three containers 12, 40, and 60 are in fluid communication with each other, as the water 16 exits the holding tank 220 and enters the middle container 60 (outside of the holding tank 220), the elevation of the water 16 in each of the containers 12, 40, and 60 rises (to stay at equal elevations). Because the surface areas of the water 16 in the fixed container 12 and the middle container 40 are much smaller (due to the crowding-out effect of float 210 and the holding tank 220) than the surface area of the water 16 in the outer container 40, an equal rise in elevation corresponds to a receipt in the outer container 40 of a much greater volume of the water 16. That is, when air is added to the holding tank 220, the outer container 40 receives a much greater volume and weight of water 16 than the fixed container 12 or the middle container 60, than outer container 40 would have received without the presence of float 210 and holding tank 220.

Again, as air is added to the holding tank 220 the resulting rise in the elevations of the water 16 in each of the containers 12, 40, and 60 will be equal. That holds true no matter how long the interconnecting lever conduit 30 is. That is the nature of a communicating fluid vessel system. For example, the rise in the elevations of the water 16 in each of the containers 12, 40, and 60 will be equal when the interconnecting lever conduit 30 is short, and the rise in the elevations of the water 16 in each of the containers 12, 40, and 60 will be equal when the interconnecting lever conduit 30 is long. Said differently, the fact that the elevations of the water 16 in each of the containers 12, 40, and 60 are equal is independent of the length of the interconnecting lever conduit 30.

As described above in reference to FIGS. 6 and 7, when the system 100 is oriented between the 12 o'clock position and the 6 o'clock position, clockwise torque will be generated at the sprocket 22. Of course, since torque equals force times distance, more torque will be generated when the interconnecting lever conduit 30 is longer than when the interconnecting lever conduit 30 is shorter. This essentially is the mechanical advantage of a lever (i.e., the interconnecting lever conduit 30). Accordingly, while the rise in the elevations of the water 16 in each of the containers 12, 40, and 60 is independent of the length of the interconnecting lever conduit 30, making the interconnecting lever conduit 30 longer generates more clockwise torque at the sprocket 22 (when the system 100 is oriented between the 12 o'clock position and the 6 o'clock position) than a shorter interconnecting lever conduit 30.

The float 210 (in the fixed container 12) and the holding tank 220 (in the middle container 60) are tethered to each other so that together they displace a constant volume of their surrounding water 16 as they float in the fixed container 12 and the middle container 60. The float 210 and the holding tank 220 are tethered to each other so that the total displacement of both the float 210 and holding tank 220 remains the same, even as the elevations of the columns of water 16 change in the three containers 12, 60, and 40 (e.g., as the middle container 60 and outer container 40 rotate around the fixed container 12, refer to FIG. 6). In addition, the float 210 and the holding tank 220 are designed to minimize the surface area of the water 16 in the fixed container 12 and middle container 60 so that any changes to the elevations of the columns of the water 16 (not caused by the rotation of outer container 40 and middle container 60) will be allocated on a volume and weight basis to a greater extent to the outer container 40 than to the fixed container 12 or the middle container 60. Said another way, changes to the displacement of water 16 by holding tank 220 because of changes in the volume of air 14 in holding tank 220 are volumetrically allocated in favor of outer container 40.

It is advantageous when changes in the holding tank's 220 displacement of its surrounding water 16 cause the greatest changes in the volume and weight of water 16 in the outer container 40. That is the case because the outer container 40 is the container located farthest from the pivot point (at the axis of the tube 20), will maximize the mechanical advantage of the interconnecting lever conduit 30. In other words, the torque at the sprocket 22 (FIGS. 6 and 7) that is generated by the outer container 40 between the 12 o'clock and 6 o'clock positions is increased to a greater extent when the majority of the weight of the water 16 is added to the outer container 40 (rather than to the fixed container 12 or the middle container 60).

Figure 11:
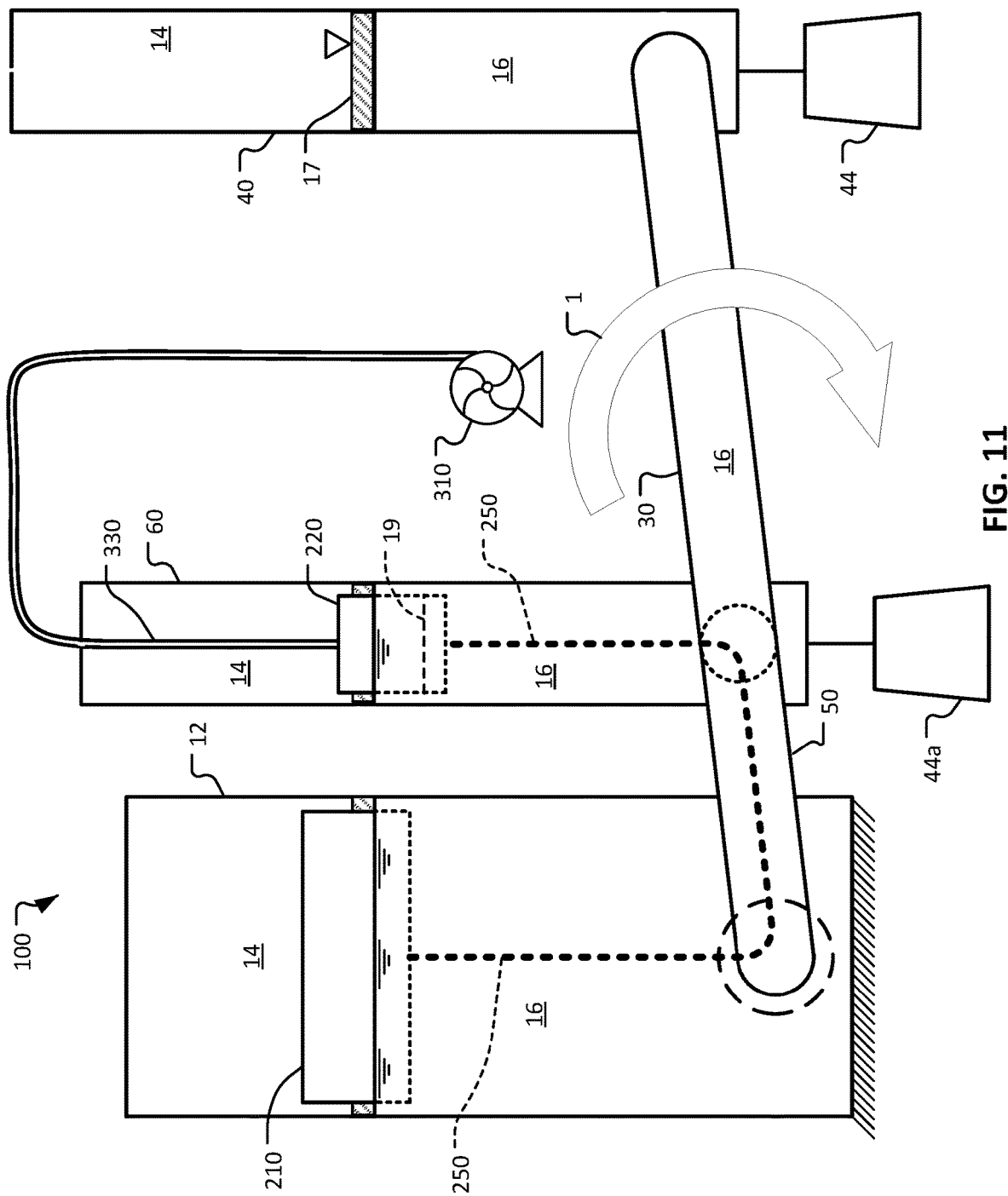
FIG. 11 is another schematic front view of the two-lever communicating vessel system of FIG. 7. This illustration shows even more additional components of the system.

As shown in FIG. 11, the system 100 also includes a compressor 310. The compressor 310 can discharge a pressurized gas, such as air 14, to infill the holding tank 220. The compressor 310 can be electrically driven by a motor in some embodiments. In some examples, the compressor 310 can be mechanically assisted by the rotations of the interconnecting lever conduit 30 and/or the short lever conduit 50.

As air 14 is moved into holding tank 220, gravity causes the elevation of the water 16 in middle container 60 to seek equilibrium, moving a volume of the water 16 to the fixed container 12 and a volume of the water 16 to outer container 40. Said another way, the water column heights of the vessels within the system 100 will always seek elevation equilibrium. The allocation of the change in volume and weight of the water 16 displaced by the change of the volume of the air 14 in the holding tank 220 is divided between the fixed container 12, the outer container 40, and middle container 60 based upon the surface areas of the water 16 in each of the three containers 12, 40, and 60. Since the float 210 and holding tank 220 are designed to crowd out most of the surface area of the water 16 in the fixed container 12 and the middle container 60, most of the change in the volume and weight of the water 16 occurs in the outer container 40. This principle holds true as the amount of air 14 in the holding tank 220 increases (a greater amount of increase of volume/weight of the water 16 occurs in the outer container 40 as compared to if the float 210 and holding tank 220 were not present), and also as the amount air 14 in the holding tank 220 decreases (a greater amount of decrease of volume/weight of the water 16 occurs in the outer container 40 as compared to if the float 210 and holding tank 220 were not present).

Air 14 is moved to and from holding tank 220 by way of the compressor 310. The air 14 is moved into holding tank 220 when its outer container 40 is at the top of the rotation (at the 12 o'clock position), and the air 14 is moved out of the holding tank 220 when its outer container 40 is at the bottom of the rotation (at the 6 o'clock position). Operating the compressor 310 in this manner is akin to expanding the bladder 3 of the system 10 in FIGS. 1-4 to displace the additional fluid 17 to the top of the fluid column in the outer container 40.

It should be understood that the additional fluid 17 found in the outer containers 40 on one side of the rotation (from 12 o'clock to 6 o'clock), but not the other side of the rotation (from 6 o'clock to 12 o'clock), is used to rotate the system 1000. After the additional fluid 17 in each outer container 40 reaches the bottom of the rotation (at 6 o'clock), the additional fluid 17 is then shifted out of its outer container 40 and melds into the fluid 16 of the overall system 100. Since the fluid 16 is fungible, the force of the additional fluid 17, as it melds into the fluid 16 of its overall system 100, essentially moves from outer container 40 back to middle container 60 and fixed container 12, and remains in middle container 60 and fixed container 12, until it is again needed when its outer container 40 is at the top of the rotation (at 12 o'clock).

Essentially, the additional fluid 17 in each outer container 40 falls from the top of the rotation (at 12 o'clock) to the bottom of the rotation (at 6 o'clock), causing the system 1000 to rotate. At the bottom of the rotation (at 6 o'clock), the additional fluid 17 is moved away from its outer container 40 and becomes part of the fluid 16 in its overall system 100. This transfers the volume/weight of additional fluid 17 to the middle container 60 and fixed container 12, to wait until the outer container 40 once again reaches the top of the rotation (at 12 o'clock).

In its simplest form the system 100 is the combination of: (i) a lever and (ii) a communicating fluid vessel system. To work in cooperation with substantial effectiveness, a number of these lever/communicating fluid vessel systems 100 can be coupled or ganged together in a balanced fashion to create the overall system 1000 (e.g., as shown in FIG. 6) with the interconnecting lever conduits 30 being equally spaced apart like spokes in a Ferris wheel. The pivot points of the interconnecting lever conduits 30 of the overall system 1000 represent the center of this Ferris wheel-like design, and the gondolas at the end of each spoke correspond to the outer containers 40. If each system 100 had a common pivot point, the outer containers 40 would become entangled with each other. Therefore, the overall system 1000 can be designed so that each system 100 is coupled to a common shaft, and the common shaft can also drive an electricity generator, pump, or other useful device.

The overall system 1000 (e.g., as shown in FIG. 6) is designed so that the added weight from the additional fluid 17 in the outer container 40 at the end of each interconnecting lever conduit 30 (resulting from changes in the column heights in its communicating vessels) intentionally occurs on one side of the rotation of the outer containers 40, and does not occur on the opposite side of the rotation. By ganging these systems 100 together, and by adding work to the systems 100 from the compressors 310, rotational energy is applied to the common shaft to make the system 1000 rotate.

Some of the rotational energy created by the rotating system 1000 is consumed by the energy required to lift the fluid 16 in each outer container 40 from the bottom of the rotation back to the top of the rotation. However, decreasing the volume of air 14 in holding tank 220 when its outer container 40 is at the bottom of the rotation decreases the amount of fluid 16 in outer container 40. Additionally, before air 14 is moved into the holding tanks 220 of any of the multiple systems 100 that are ganged together, the wheel and axle design is rotationally balanced. Being rotationally balanced reduces the work needed to rotate the wheel to return each outer container 40 from the bottom to the top of the rotation.

As described above, moving air 14 into the holding tank 220 increases the elevation of the fluid 16 in the middle container 60. Then, after the fluid elevations in all three containers 12/40/60 have naturally equalized, the fluid Vadditional 17 results at the end of the interconnecting lever conduit 30. Conversely, moving air 14 out of the holding tank 220 reduces the elevation of the fluid 16 in the middle container 60.

Then, after the fluid elevations in all three containers 12/40/60 have naturally equalized, Vadditional 17 is no longer present at the end of its lever conduit 30.

Increasing the length of the interconnecting lever conduit 30 in each system 100 increases the distance that each Vadditional 17 can fall during rotation, which increases the work that each Vadditional 17 can individually do.

The holding tank 220, being linked to the float 210 by the tether 250, maintains its partially submerged orientation with respect to the interface between the fluid 16 and the air 14, as the elevation of the fluid 16 in middle container 60 rises and falls. This position maintains the effectiveness of the displacement of fluid 16 in holding tank 220 (to be in favor of the outer container 40 by weight/volume of water 16), as well as reduces the amount of work needed from the compressor 310 to move air 14 into and out of holding tank 220.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described herein as acting in certain combinations and even initially claimed as such, one or more features from a claimed combination can in some cases be excised from the combination, and the claimed combination may be directed to a sub-combination or variation of a sub-combination. Particular embodiments of the subject matter have been described. Other embodiments are within the scope of the following claims.

What is claimed is:

1. An engine system with communicating fluid vessels, the engine system comprising:
 a first fluid container containing a fluid;
 a second fluid container containing the fluid;
 a third fluid container containing the fluid;
 a first interconnecting lever conduit containing the fluid and rotatably coupled to the first fluid container at a first axis, the first interconnecting lever conduit also rotatably coupled to the third fluid container, the first interconnecting lever conduit defining a first fluid passageway by which the first and third fluid containers are in fluid communication;
 a second interconnecting lever conduit containing the fluid and rotatably coupled to the first fluid container at the first axis and coupled to the first interconnecting lever conduit in a fixed arrangement, the second interconnecting lever conduit also rotatably coupled to the second fluid container, the second interconnecting lever conduit defining a second fluid passageway by which the first and second fluid containers are in fluid communication,
 wherein the second and third fluid containers are free to revolve around the first fluid container as the first and second interconnecting lever conduits rotate about the first axis relative to the first fluid container;

a buoyant member in the first fluid container, wherein the buoyant member is partially in the fluid and partially above the fluid;

a tank in the second fluid container and comprising: (i) a lower portion configured to allow the fluid to pass into and out of an interior of the tank and (ii) an upper portion that is fluidly sealed;

a tether physically linking the buoyant member and the tank together; and a supply of a gas that is in fluid communication with the interior of the tank, wherein supplying the gas to the interior of the tank displaces at least some of the fluid from the interior of the tank to increase a column height of the fluid in each of the first, second, and third fluid containers.

2. The engine system of claim 1, wherein, as the fluid is displaced from the interior of the tank, an elevation of the fluid increases equally in each of the first, second, and third fluid containers.

3. The engine system of claim 2, wherein, as the fluid is displaced from the interior of the tank, a mass of the fluid in the third fluid container increases more than a a mass of the fluid in the second fluid container.

4. The engine system of claim 3, wherein the increased mass of the fluid in the third container increases a torque exerted on the first interconnecting lever conduit by the third container.

5. The engine system of claim 4, further comprising an electrical generator, and wherein the torque drives rotations of the electrical generator.

6. The engine system of claim 1, wherein each of the first, second, and third fluid containers are vented to atmosphere.

7. The engine system of claim 1, wherein each of the second and third fluid containers have an attached weight that causes the second and third fluid containers to maintain a vertical orientation as the second and third fluid containers revolve around the first fluid container.

8. The engine system of claim 1, wherein the supply of the gas is an air compressor.

9. The engine system of claim 1, wherein the first fluid container has a greater cross-sectional area than the second and third fluid containers.

10. The engine system of claim 1, wherein the second fluid container is disposed between the first and third fluid containers.

11. An engine system with communicating fluid vessels, the engine system comprising:
an output shaft; and
two or more engines that each comprise:
a first fluid container containing a fluid;
a second fluid container containing the fluid;
a third fluid container containing the fluid;
a first interconnecting lever conduit containing the fluid and rotatably coupled to the first fluid container at a first axis, the first interconnecting lever conduit also rotatably coupled to the third fluid container, the first interconnecting lever conduit defining a first fluid passageway by which the first and third fluid containers are in fluid communication;
a second interconnecting lever conduit containing the fluid and rotatably coupled to the first fluid container at the first axis and coupled to the first interconnecting lever conduit in a fixed arrangement, the second interconnecting lever conduit also rotatably coupled to the second fluid container, the second interconnecting lever conduit defining a second fluid passageway by which the first and second fluid containers are in fluid communication, wherein the second and third fluid containers are free to revolve around the first fluid container as the first and second interconnecting lever conduits rotate about the first axis relative to the first fluid container;

a buoyant member in the first fluid container, wherein the buoyant member is partially in the fluid and partially above the fluid;

a tank in the second fluid container and comprising: (i) a lower portion configured to allow the fluid to pass into and out of an interior of the tank and (ii) an upper portion that is fluidly sealed;

a tether physically linking the buoyant member and the tank together; and a supply of a gas that is in fluid communication with the interior of the tank, wherein supplying the gas to the interior of the tank displaces at least some of the fluid from the interior of the tank to increase a column height of the fluid in each of the first, second, and third fluid containers, wherein the two or more engines are each coupled to and drive rotations of the output shaft.

12. The engine system of claim 11, further comprising an electrical generator, and wherein the rotations of the output shaft drive rotations of the electrical generator.

13. The engine system of claim 11, wherein the first interconnecting lever conduit of the two or more engines are arranged in rotational symmetrical positions in relation to each other as a means to obtain rotational balance of the engine system.

14. An engine system comprising at least one communicating fluid vessel system, each communicating fluid vessel system comprising:
a first fluid container containing a fluid;
a second fluid container containing the fluid;
a third fluid container containing the fluid; and
at least one lever, wherein the at least one lever comprises:
a first interconnecting lever conduit containing the fluid and rotatably coupled to the first fluid container at a first axis, the first interconnecting lever conduit also rotatably coupled to the third fluid container, the first interconnecting lever conduit defining a first fluid passageway by which the first and third fluid containers are in fluid communication; and
a second interconnecting lever conduit containing the fluid and rotatably coupled to the first fluid container at the first axis and coupled to the first interconnecting lever conduit in a fixed arrangement, the second interconnecting lever conduit also rotatably coupled to the second fluid container, the second interconnecting lever conduit defining a second fluid passageway by which the first and second fluid containers are in fluid communication, wherein the engine system is configured to use a propensity of the fluid to seek its own level to shift the fluid to and from an end of the lever to generate torque and to supply motive power.

15. The engine system of claim 14, wherein the second and third fluid containers are free to revolve around the first fluid container as the first and second interconnecting lever conduits rotate about the first axis relative to the first fluid container.

16. The engine system of claim 14, further comprising:
a buoyant member in the first fluid container, wherein the buoyant member is partially in the fluid and partially above the fluid; and a tank in the second fluid container and comprising: (i) a lower portion configured to allow the fluid to pass into and out of an interior of the tank and (ii) an upper portion that is fluidly sealed.

17. The engine system of claim 16, further comprising a tether physically linking the buoyant member and the tank together.

18. The engine system of claim 16, further comprising a supply of a gas that is in fluid communication with the interior of the tank, wherein supplying the gas to the interior of the tank displaces at least some of the fluid from the interior of the tank to increase a column height of the fluid in each of the first, second, and third fluid containers.

19. An engine system comprising at least one communicating fluid vessel system, each communicating fluid vessel system comprising:
 a first fluid container containing a fluid;
 a second fluid container containing the fluid;
 a third fluid container containing the fluid;
 at least one lever;
 a buoyant member in the first fluid container, wherein the buoyant member is partially in the fluid and partially above the fluid; and
 a tank in the second fluid container and comprising: (i) a lower portion configured to allow the fluid to pass into and out of an interior of the tank and (ii) an upper portion that is fluidly sealed,
 wherein the engine system is configured to use a propensity of the fluid to seek its own level to shift the fluid to and from an end of the lever to generate torque and to supply motive power.

20. The engine system of claim 19, wherein the at least one lever comprises:

a first interconnecting lever conduit containing the fluid and rotatably coupled to the first fluid container at a first axis, the first interconnecting lever conduit also rotatably coupled to the third fluid container, the first interconnecting lever conduit defining a first fluid passageway by which the first and third fluid containers are in fluid communication; and a second interconnecting lever conduit containing the fluid and rotatably coupled to the first fluid container at the first axis and coupled to the first interconnecting lever conduit in a fixed arrangement, the second interconnecting lever conduit also rotatably coupled to the second fluid container, the second interconnecting lever conduit defining a second fluid passageway by which the first and second fluid containers are in fluid communication.

21. The engine system of claim 20, wherein the second and third fluid containers are free to revolve around the first fluid container as the first and second interconnecting lever conduits rotate about the first axis relative to the first fluid container.

22. The engine system of claim 19, further comprising a tether physically linking the buoyant member and the tank together.

23. The engine system of claim 19, further comprising a supply of a gas that is in fluid communication with the interior of the tank, wherein supplying the gas to the interior of the tank displaces at least some of the fluid from the interior of the tank to increase a column height of the fluid in each of the first, second, and third fluid containers.

* * * * *